United States Patent
Mariani et al.

(10) Patent No.: US 10,233,315 B2
(45) Date of Patent: Mar. 19, 2019

(54) CROSSLINKABLE COMPOSITION COMPRISING POLYETHYLENE AND USE THEREOF FOR ROTATIONAL MOLDING

(71) Applicant: Versalis S.p.A., San Donato Milanese (mi) (IT)

(72) Inventors: Paolo Mariani, Milan (IT); Daniele Balducci, San Giorgio di Mantova (IT)

(73) Assignee: Versalis, S.P.A., San Donato Milanese (IT)

( * ) Notice: Subject to any disclaimer, the term of this patent is extended or adjusted under 35 U.S.C. 154(b) by 39 days.

(21) Appl. No.: 15/516,631

(22) PCT Filed: Oct. 8, 2015

(86) PCT No.: PCT/IB2015/057690
§ 371 (c)(1),
(2) Date: Apr. 3, 2017

(87) PCT Pub. No.: WO2016/055959
PCT Pub. Date: Apr. 14, 2016

(65) Prior Publication Data
US 2017/0247534 A1  Aug. 31, 2017

(30) Foreign Application Priority Data
Oct. 9, 2014  (IT) .............................. MI2014A1767

(51) Int. Cl.
| | |
|---|---|
| *C08L 23/00* | (2006.01) |
| *C08K 5/14* | (2006.01) |
| *C08F 10/02* | (2006.01) |
| *C08L 23/06* | (2006.01) |
| *B29C 41/00* | (2006.01) |
| *B29C 41/04* | (2006.01) |
| *C08L 23/08* | (2006.01) |
| *C08F 255/02* | (2006.01) |
| *C08L 23/26* | (2006.01) |
| *C08K 5/00* | (2006.01) |
| *B29K 105/24* | (2006.01) |
| *B29K 23/00* | (2006.01) |

(52) U.S. Cl.
CPC ............ *C08L 23/06* (2013.01); *B29C 41/003* (2013.01); *B29C 41/04* (2013.01); *C08K 5/14* (2013.01); *C08L 23/0815* (2013.01); *B29K 2023/065* (2013.01); *B29K 2023/0625* (2013.01); *B29K 2105/24* (2013.01); *C08F 10/02* (2013.01); *C08F 255/02* (2013.01); *C08F 2500/12* (2013.01); *C08F 2810/20* (2013.01); *C08K 5/0025* (2013.01); *C08L 23/00* (2013.01); *C08L 23/26* (2013.01); *C08L 2205/02* (2013.01); *C08L 2205/025* (2013.01); *C08L 2207/062* (2013.01); *C08L 2207/066* (2013.01); *C08L 2312/00* (2013.01); *C08L 2666/34* (2013.01)

(58) Field of Classification Search
None
See application file for complete search history.

(56) References Cited

U.S. PATENT DOCUMENTS

| | | | |
|---|---|---|---|
| 4,900,792 A | 2/1990 | Chen et al. | |
| 5,306,775 A | 4/1994 | Martin et al. | |
| 5,367,025 A | 11/1994 | Needham | |
| 5,928,584 A * | 7/1999 | Lee | B29C 41/003 |
| | | | 264/310 |
| 2005/0215719 A1 | 9/2005 | Lustiger et al. | |
| 2011/0135934 A1* | 6/2011 | Seidel | B29C 37/0028 |
| | | | 428/412 |

FOREIGN PATENT DOCUMENTS

| | | |
|---|---|---|
| JP | 2004231844 A | 8/2004 |
| WO | 97/46610 A1 | 12/1997 |

OTHER PUBLICATIONS

MatWeb.com, webpage for NOVA Chemicals Sclair 8111 LLDPE Injection Molding Resin, retrieved from matweb.com on Jul. 12, 2018. (Year: 2018).*
International Search Report for PCT/IB2015/057690 dated Dec. 15, 2015, 11 pages.

* cited by examiner

*Primary Examiner* — Richard A Huhn
(74) *Attorney, Agent, or Firm* — Abel Law Group, LLP

(57) ABSTRACT

Crosslinkable composition comprising: (a) from 80% by weight to 98% by weight, preferably from 85% by weight to 95% by weight, of at least one high density polyethylene (HDPE); (b) from 2% by weight to 20% by weight, preferably from 5% by weight to 15% by weight, of at least one linear low density polyethylene (LLDPE); (c) from 0.2 parts by weight to 1.5 parts by weight, preferably from 0.5 parts by weight to 0.8 parts by weight, with respect to 100 parts by weight of (a)+(b), of at least one crosslinking agent selected from organic peroxides; (d) from 0.2 parts by weight to 2.5 parts by weight, preferably from 0.5 parts by weight to 1.0 parts by weight, with respect to 100 parts by weight of (a)+(b), of at least one co-crosslinking agent selected from allyl compounds. Said crosslinkable composition can advantageously be used in rotational molding ("rotomolding").

17 Claims, No Drawings

CROSSLINKABLE COMPOSITION COMPRISING POLYETHYLENE AND USE THEREOF FOR ROTATIONAL MOLDING

The present invention relates to a crosslinkable composition comprising polyethylene. More specifically, the present invention relates to a crosslinkable composition comprising at least one high density polyethylene (HDPE), at least one linear low density polyethylene (LLDPE), at least one crosslinking agent selected from organic peroxides, at least one co-crosslinking agent selected from allyl compounds.

Said crosslinkable composition can advantageously be used for rotational molding ("rotomolding").

The present invention therefore further relates to the use of said crosslinkable composition in rotational molding ("rotomolding") and to the products obtained by said rotational molding ("rotomolding").

Rotational molding ("rotomolding") is widely used for molding hollow articles, and can be used for molding both small and large containers such as, for example, tanks of variable volume, typically ranging from 1 liter to 57000 liters. Said containers are used for packaging and transporting material, in particular as containers for fluids or solids. Rotational molding can further be used for portable toilets, cases for instruments and batteries, light spheres, household steam cleaners and brushes, waste containers. Rotational molding ("rotomolding") is a process that is relatively inexpensive and simple to use by comparison with other processes for producing polymers, and the use thereof is therefore increasing.

Compositions comprising polyethylene which can be used in rotational molding are known in the art.

For example, U.S. Pat. No. 4,900,792 discloses a composition consisting essentially of:
a polymer selected from ethylene homopolymers and ethylene copolymers, or mixtures thereof, said polymers having substantially complete terminal saturation;
from 0.1 parts by weight to 3.0 parts by weight based on 100 parts by weight of the polymer of an organic peroxide as crosslinking agent; from 0.5 parts by weight to 5.0 parts by weight based on 100 parts by weight of the polymer of an allyl co-crosslinking agent selected from the group of dimethacrylate compounds, trimethacrylate compounds, divinyl benzene, vinyl toluene, vinyl pyridine, p-quinone dioxime, acrylic acid, cyclohexyl methacrylate, and 1,2-polybutadiene;
sufficient amount of a metal compound having a cation selected from Group IIA and IIB of the Periodic Table of Elements to substantially neutralize acidic compound in the polymer; and
a peroxide as radical scavenger.

The above-mentioned composition is said to be advantageously used in molding processes, for example in rotational molding ("rotomolding").

U.S. Pat. No. 5,082,902 discloses a method for forming articles comprising:
(1) preparing a polymer blend having a Melt Flow Index (MFI) of from 1 g/10 minutes to 200 g/10 minutes, a Melt Flow Rate (MFR) lower than 35 and a density higher than 0.935 g/cm$^3$ comprising:
(a) 5% by weight to 50% by weight of a first polymer, having a density of from 0.85 g/cm$^3$ to 0.95 g/cm$^3$, a Melt Flow Index (MFI) of from 1 g/10 minutes to 200 g/10 minutes and a Melt Flow Rate (MFR) lower than 35, said first polymer comprising a copolymer of ethylene with an α-olefin having from 3 to 10 carbon atoms;
(b) from 50% by weight to 95% by weight of a second polymer having a density which is from 0.015 g/cm$^3$ to 0.15 g/cm$^3$ higher than the density of said first polymer, a Melt Flow Index (MFI) differing by no more than 50% from the Melt Flow Index (MFI) of said first polymer, and a Melt Flow Rate (MFR) lower than 35, said second polymer comprising a homopolymer or a copolymer of ethylene with an α-olefin having from 3 to 10 carbon atoms;
(2) subjecting said polymer blend to injection molding or rotational molding ("rotomolding").

The above-mentioned articles are said not to exhibit the severe deformations often found if nucleating agents are used and to have improved physical properties [e.g., total impact energy, environmental stress crack resistance (ESCR)].

U.S. Pat. No. 5,306,775 discloses a composition comprising:
(a) 30% by weight to 70% by weight of a low molecular weight ethylene homopolymer, wherein said homopolymer is obtained by polymerizing ethylene with a chromium oxide based catalyst system, and wherein said homopolymer has a density higher than 0.96 g/cm$^3$, a Melt Flow Index (MFI) higher than 30 g/10 minutes, a heterogeneity index of from 2 to 35, and a High Load Melt Flow Index (HLMFI)/Melt Flow Index (MFI) ratio lower than 40,
(b) from 30% by weight to 70% by weight of a high molecular weight ethylene copolymer, wherein said copolymer is obtained by copolymerizing ethylene with an α-olefin with a titanium chloride based catalyst system, and wherein said copolymer has a density less than 0.955 g/cm$^3$, a High Load Melt Flow Index (HLMFI) of from 0.1 g/10 minutes to 50 g/10 minutes, and a heterogeneity index of from 2 to 10,
wherein said weight percents are based on the total weight of said homopolymer (a) and copolymer (b); and
wherein said composition has a Melt Flow Index (MFI) higher than 0.05 g/10 minutes and is essentially free of other ethylene polymers.

The above-mentioned composition is said to have an improved Environmental Stress Crack Resistance (ESCR).

US patent application 2005/0215719 discloses a polyethylene-based composition comprising:
(a) a first polyethylene having a Melt Flow Index (MFI) of from 0.4 g/10 min to 3.0 g/10 min and a density of from 0.910 g/cm$^3$ to 0.930 g/cm$^3$; and
(b) a second polyethylene having a Melt Flow Index (MFI) of from 10 g/10 min to 30 g/10 min and a density of from 0.945 g/cm$^3$ to 0.975 g/cm$^3$,
wherein the composition has a density of from 0.930 g/cm$^3$ to 0.955 g/cm$^3$ and a Melt Flow Index (MFI) of from 1.5 g/10 min to 12 g/10 min, wherein the second polyethylene is present in an amount ranging from 20% by weight to 65% by weight with respect to the total weight of the first and of the second polyethylene and wherein the first and the second polyethylenes differ in density by from 0.030 g/cm$^3$ to 0.048 g/cm$^3$.

The above mentioned composition is said to be advantageously used in rotational molding ("rotomolding"). Further, the above mentioned composition is said to have improved physical properties such as improved Environmental Stress Crack Resistance (ESCR) and Izod Impact Strength.

Since, as stated above, rotational molding ("rotomolding") is a process which is relatively less expensive and simpler to use with respect to other processes for processing polymers and the use thereof is therefore increasing, the study of novel polyethylene-based compositions useful in said rotational molding ("rotomolding") continues to be of great interest.

The Applicant has therefore taken on the problem of finding crosslinkable polyethylene-based compositions which can advantageously be used in rotational molding ("rotomolding").

The Applicant has now found that crosslinkable compositions comprising at least one high density polyethylene (HDPE), at least one linear low density polyethylene (LLDPE), at least one crosslinking agent selected from organic peroxides, at least one co-crosslinking agent selected from allyl compounds, in the specific amounts stated below, are advantageously useful in rotational molding ("rotomolding"). In particular, the Applicant has found that said crosslinkable compositions can provide crosslinked products having both improved mechanical properties, in particular Elongation at Break and Izod Impact Strength, and a good Environmental Stress Crack Resistance (ESCR).

The present invention therefore relates to a crosslinkable composition comprising:

(a) from 80% by weight to 98% by weight, preferably from 85% by weight to 95% by weight, of at least one high density polyethylene (HDPE);
(b) from 2% by weight to 20% by weight, preferably from 5% by weight to 15% by weight, of at least one linear low density polyethylene (LLDPE);
(c) from 0.2 parts by weight to 1.5 parts by weight, preferably from 0.5 parts by weight to 0.8 parts by weight, with respect to 100 parts by weight of (a)+(b), of at least one crosslinking agent selected from organic peroxides;
(d) from 0.2 parts by weight to 2.5 parts by weight, preferably from 0.5 parts by weight to 1.0 parts by weight, with respect to 100 parts by weight of (a)+(b), of at least one co-crosslinking agent selected from allyl compounds.

For the purpose of the present description and of the following claims, the definitions of numerical ranges always include the endpoints unless stated otherwise.

For the purpose of the present description and of the following claims, the term "comprising" also includes the terms "consisting essentially of" and "consisting of".

In a preferred embodiment of the present invention, said high density polyethylene (HDPE) (a) may be selected from polyethylenes having a density higher than 0.940 g/cm³, preferably ranging from 0.950 g/cm³ to 0.960 g/cm³, and a Melt Flow Index (MFI), measured at 190° C. with a load of 2.16 kg in accordance with ISO 1133-1: 2011 standard, ranging from 10 g/10 minutes to 100 g/10 minutes, preferably ranging from 15 g/10 minutes to 35 g/10 minutes.

In a preferred embodiment of the present invention, said linear low density polyethylene (LLDPE) (b) may be selected from polyethylenes having a density lower than 0.940 g/cm³, preferably ranging from 0.915 g/cm³ to 0.935 g/cm³, and a Melt Flow Index (MFI), measured at 190° C. with a load of 2.16 kg in accordance with ISO 1133-1:2011 standard, ranging from 1 g/10 minutes to 100 g/10 minutes, preferably ranging from 15 g/10 minutes to 35 g/10 minutes.

In a preferred embodiment of the present invention, said high density polyethylene (HDPE) (a) and said linear low density polyethylene (LLDPE) (b) have the same Melt Flow Index (MFI).

In a further preferred embodiment of the present invention, said linear low density polyethylene (LLDPE) (b) has a Melt Flow Index (MFI) higher than said high density polyethylene (HDPE).

The density of said high density polyethylene (HDPE) (a) and said linear low density polyethylene (LLDPE) (b) was determined in accordance with ISO 1183-1:2004 standard. Examples of high density polyethylenes (HDPE) (a) which may be used in the present invention and which are currently commercially available are the Eraclene® products from the MQ 70 U, MR 80 U, MS 80 U series, from versalis spa.

Examples of linear low density polyethylenes (LLDPE) (b) which may be used in the present invention and which are currently commercially available are the Flexirene® products from the MR 50 A, MR 50 U, MR 56 A, MS 20 A, MS 20 U, MS 26 A, MS 40 A, MS 40 U, MT 40 A series, from versalis spa.

The aforementioned polyethylenes (a) and (b) may be obtained by polymerization techniques known in the art in the presence of Ziegler-Natta catalysts, or in the presence of single-site catalysts such as metallocene or hemi-metallocene catalysts.

In a preferred embodiment of the present invention, said organic peroxides (c) may be selected, for example, from organic peroxides having general formula (I):

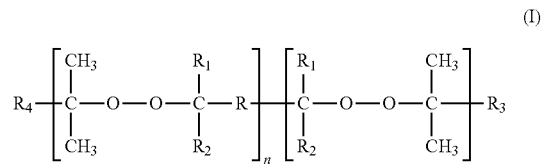

(I)

in which:
R is a divalent hydrocarbon group, preferably selected from:

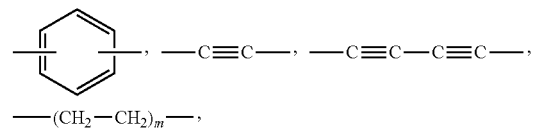

in which m represents a number ranging from 1 to 8;
$R_1$ and $R_2$, equal or different, represent a linear or branched $C_1$-$C_{12}$, preferably $C_1$-$C_6$ alkyl group;
$R_3$ and $R_4$, equal or different, represent a linear or branched $C_1$-$C_{12}$, preferably $C_1$-$C_6$ alkyl group;
n is 0 or 1.

In a particularly preferred embodiment of the present invention, said organic peroxides having general formula (I) may be selected, for example, from: bis(alkylperoxy)alkanes such as, for example, 2,5-bis(t-amylperoxy)-2,5-dimethylhexane, 2,5 bis(t-butylperoxy)-2,5-dimethylhexane, 3,6-bis(t-butylperoxy)-3,6-dimethyloctane, 2,7-bis(t-butylperoxy)-2,7-dimethyloctane, 8,11-bis(t-butylperoxy)-8,11-dimethyloctadecane, or mixtures thereof; bis(alkylperoxy)benzenes such as, for example, αα'-bis(t-amylperoxy-iso-propyl)benzene, αα'-bis(t-butylperoxy-iso-propyl)benzene, or mixtures thereof; bis(alkylperoxy)acetylenes such as, for example, 2,7-dimethyl-2,7-di(t-butylperoxy)-octadiyne-3,5, 2,7-dimethyl-2,7-di(peroxyethylcarbonate)-octadiyne-3,5,3, 6-dimethyl-3,6-di(peroxyethylcarbonate)octyne-4,3,6-dimethyl-3,6-di(t-butyl-peroxy)octyne-4,2,5-dimethyl-2,5-di (peroxy-n-propylcarbonate)hexyne-3,2,5-dimethyl-2,5-di (peroxy-iso-butylcarbonate)hexyne-3,2,5-dimethyl-2,5-di (peroxyethyl-carbonate)hexyne-3,2,5-dimethyl-2,5-di(α-cumylperoxy)hexyne-3,2,5-dimethyl-2,5-di(t-butylperoxy) hexyne-3, or mixtures thereof; or mixtures thereof. 2,5-dimethyl-2,5-di(t-butylperoxy)hexyne-3 is particularly preferred.

Examples of organic peroxides (c) which may be used in the present invention and which are currently commercially available are the Trigonox® 145-E85, Trigonox® 145-45B-pd products, from Akzo Nobel.

In a preferred embodiment of the present invention, said allyl compounds (d) are selected from: allyl methacrylate, diallyl itaconate, diallyl phthalate, triallyl trimellitate, triallyl trimethallyl trimellitate, triallyl cyanurate (TAC), triallyl iso-cyanurate (TAIC), triallyl phosphate, or mixtures thereof. Triallyl cyanurate (TAC) is particularly preferred.

Examples of allyl compounds (d) which may be used in the present invention and which are currently commercially available are the Luvomaxx® TAC DL 50, Luvomaxx® TAC products, from Lehvoss.

To prevent premature crosslinking, both during the preparation of the crosslinkable composition according to the present invention and during the molding thereof, a peroxide scavenger may optionally be added to said crosslinkable composition.

In a preferred embodiment of the present invention, said crosslinkable composition may comprise (e) at least one peroxide scavenger selected, for example, from: sulfur-containing compounds such as, for example, esters of thiodipropionic acid, or mixtures thereof; organic phosphites, organic phosphonates, organic phosphonites, organic phosphates such as, for example, di(stearyl)pentaerythritol diphosphite, tetrakis(2,4-di-t-butylphenyl)-4,4'-biphenylene-diphosphonite, or mixtures thereof. Sulfur-containing compounds are preferred, even more preferred are thiodipropionic acid esters having general formula (II):

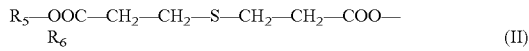

(II)

in which $R_5$ and $R_6$, equal or different, represent a hydrogen atom, or are selected from alkyl groups, alkenyl groups, aryl groups, cycloalkyl groups.

Specific examples of $R_5$ and $R_6$ groups are: methyl, ethyl, propyl, iso-propyl, butyl, iso-butyl, t-butyl, amyl, iso-amyl, n-octyl, iso-octyl, 2-ethyl-hexyl, t-octyl, decyl, dodecyl, octadecyl, allyl, hexenyl, linoleyl, ricinoleyl, lauryl, stearyl, miristyl, oleyl, phenyl, xylyl, tolyl, ethylphenyl, naphthyl, cyclohexyl, benzyl, cyclopentyl, methylcyclohexyl, ethyl-cyclohexyl, naphthenyl.

Specific examples of thiodipropionic acid ester which may advantageously used in the crosslinkable composition according to the present invention are: monolauryl thiodipropionate, dilauryl thiodipropionate, dimiristyl thiodipropionate, distearyl thiodipropionate, dimiristyl thiodipropionate, dioleyl thiodipropionate, diricinooleyl thiodipropionate, butyl stearyl thiodipropionate, 2-ethylhexyl lauryl thiodipropionate, di-iso-decyl thiodipropionate, iso-decyl phenyl thiodipropionate, benzyl lauryl thiodipropionate, diesters derived from mixing coconut fatty alcohols and thiodipropionic acid, diesters derived from mixing tallow fatty alcohols and thiodipropionic acid, diesters derived from mixing cotton seed oil fatty alcohols and thiodipropionic acid, derived from mixing soya oil fatty alcohols and thiodipropionic acid, or mixtures thereof. Distearyl thiodipropionate is preferred.

In a preferred embodiment of the present invention, said peroxide scavenger (e) may be present in said crosslinkable composition in an amount ranging from 0.01 parts by weight to 0.1 parts by weight, preferably ranging from 0.05 parts by weight to 0.08 parts by weight, with respect to 100 parts by weight of (a)+(b).

In a further preferred embodiment of the present invention, said crosslinkable composition may comprise (f) at least one antioxidant selected from sterically hindered phenols.

Specific examples of sterically hindered phenols which may advantageously be used in the crosslinkable composition according to the present invention are: 1,3,5-trimethyl-2,4,6-tris(3,5-di-t-butyl-4-hydroxybenzyl)benzene, 1,3,5-tris(3,5-di-t-butyl-4-hydroxybenzyl)-5-triazine-2,4,6-(1H, 3H,5H)trione, tetrakis-[methylene-3-(3',5-di-t-butyl-4'-hydroxyphenyl)-propionate]metane, di(2-methyl-4-hydroxy-5-t-butylphenyl)sulfide, polymerized 2,2,4-trimethyl-dihydroquinoline, 2,6-di-t-butyl-4-methylphenol, $C_{13}$-$C_{15}$ alkyl esters of 3,5-bis(1,1-dimethylethyl)-4-hydroxy-benzene-propanoic acid, octadecyl-3,5-bis(1,1-dimethylethyl)-4-hydroxy-benzenepropionate, tetrakis-[methylene-3-(3',5'-di-t-butyl-4'-hydroxyphenyl)propionate] methane, or mixtures thereof. Tetrakis[methylene-3-(3',5'-di-t-butyl-4'-hydroxyphenyl)propionate]methane is preferred.

In a preferred embodiment of the present invention, said antioxidant (f) is present in said crosslinkable composition in an amount ranging from 0.01 parts by weight to 0.1 parts by weight, preferably ranging from 0.02 parts by weight to 0.05 parts by weight, with respect to 100 parts by weight of (a)+(b).

The crosslinkable composition according to the present invention may optionally comprise other additives commonly used in polyethylene-based crosslinkable compositions, in particular in polyethylene-based crosslinkable compositions which can be used in rotational molding ("rotomolding"), such as, for example: fillers, such as, for example, carbon black, clay, talc, calcium carbonate, or mixtures thereof; blowing agents; nucleating agents for blown systems; lubricants; UV stabilizers, dyes; metal deactivators, coupling agents.

The crosslinkable composition object of the present invention may be prepared by procedures known in the art.

For example, the crosslinkable composition object of the present invention may be prepared by pre-mixing the high density polyethylene (HDPE) (a) (as powder or in granulated form, preferably as powder), the linear low density polyethylene (LLDPE) (as powder or in granulated form, preferably as powder), the crosslinking agent (c), the co-crosslinking agent (d), and the other optionally present compounds disclosed above, using mixers known in the art, such as, for example, end-over drum tumbler mixers, tumble drum mixers, screw mixers, ribbon mixers, or turbomixers. The pre-mixing may be carried out at room temperature (25° C.), generally at a temperature ranging from 25° C. to 50° C., for a time ranging from 5 minutes to 30 minutes.

At the end of said pre-mixing, the obtained crosslinkable composition is extruded using co-rotating or counter-rotating twin-screw extruders, or single-screw extruders. Said extrusion may be carried out at a temperature below the crosslinking temperature, generally at a temperature ranging from 130° C. to 155° C., and for sufficient time to obtain a uniform distribution of the compounds present in the crosslinkable composition in the polymer, generally for a time ranging from 0.5 minutes to 5 minutes. At the end of said extrusion, the obtained crosslinkable composition may be granulated and subsequently formed and shaped using techniques known in the art, in particular using rotational molding ("rotomolding").

Alternatively, the crosslinking composition object of the present invention may be obtained directly by extrusion by supplying the following to an extruder, which may be selected from those listed above:
- (a) the high density polyethylene (HDPE) (as powder or in granulated form, preferably as powder);
- (b) the linear low density polyethylene (LLDPE) (as powder or in granulated form, preferably as powder);
- (c) the crosslinking agent, optionally pre-mixed with said high density polyethylene (HDPE) (as powder or in granulated form, preferably as powder) and/or with said linear low density polyethylene (LLDPE) (as powder or in granulated form, preferably as powder);
- (d) the co-crosslinking agent, optionally pre-mixed with said high density polyethylene (HDPE) (as powder or in granulated form, preferably as powder) and/or with said linear low density polyethylene (LLDPE) (as powder or in granulated form, preferably as powder);

and the above-described optionally present other compounds, optionally pre-mixed with said high density polyethylene (HDPE) (as powder or in granulated form, preferably as powder) and/or with said linear low density polyethylene (LLDPE) (as powder or in granulated form, preferably as powder), using independent metering devices (for example, volumetric metering devices), at the beginning of the extruder (i.e. at the machine inlet). Preferably, to prevent premature crosslinking, the crosslinking agent (c) is supplied at % of the length of the extruder, and in any case downstream from the zone of the extruder where the polyethylenes (a) and (b) used are melted. At the end of the extrusion, the crosslinkable composition obtained is treated as described above.

In a further aspect of the present invention, said crosslinkable composition is used in rotational molding ("rotomolding").

For this purpose, the crosslinkable composition obtained after extrusion may be granulated, for example by cutting the extruded crosslinkable composition into the form of "spaghetti" by techniques known in the art such as, for example, by using a chopper, to obtain granules which may subsequently be subjected to grinding, for example, using a rotating-blade mill, to obtain a powder having, generally, an average particle diameter of 350 µm. Subsequently, the powder obtained is placed in a hollow mold, which is typically rotated about two axes and heated within a furnace. The powder is heated for sufficient time and at a sufficient temperature to melt said polyethylenes (a) and (b) which are present in the crosslinkable composition during the rotational molding ("rotomolding"). In any case, the time and temperature used are dependent on many factors such as, for example, the thickness of the articles which it is intended to obtain by rotational molding ("rotomolding") and the temperature-sensitivity of the various components of the crosslinkable composition used: in any case, the person skilled in the art will be able to determine the most suitable process conditions. For example, as regards the crosslinkable composition according to the present invention, it is possible to operate at the following conditions: thickness of approximately 0.3 cm, furnace temperature ranging from 220° C. to 290° C., time ranging from 10 minutes to 20 minutes.

In a further aspect, the invention also relates to the end-products obtained by rotational molding ("rotomolding") of said crosslinkable composition.

Examples of end-products which can be obtained by rotational molding ("rotomolding") are: petrol tanks, large waste containers, large dustbins or silos for fertilizers.

For the purpose of better understanding the present invention and for putting it into practice, some illustrative, non-limiting examples are given in the following.

EXAMPLE 1 (COMPARATIVE)

100 g of high density polyethylene (HDPE) (Eraclene® MR 80 U from versalis spa) having the following features:
density of 0.955 g/cm$^3$;
Melt Flow Index (MFI), measured at 190° C. with a load of 2.16 kg in accordance with ISO 1133-1:2011 standard, of 25 g/10;
0.9 g of triallyl cyanurate (TAC) (Luvomaxx® TAC DL 50 from Lehvoss) and 0.65 g of 2,5-dimethyl-2,5-di(t-butylperoxy)hexyne-3 (Trigonox® 145-45B-pd from Akzo Nobel), were placed in a laboratory screw mixer at a temperature of 25° C., for 20 minutes, at a mixing speed of 60 rpm. Subsequently, the crosslinkable composition obtained was removed from the internal mixer and supplied to a co-rotating twin-screw extruder (D=30 mm; L/D=28) and extruded while working with a constant temperature profile of 135° C., at a flow rate of 7.5 kg/h, and at a screw rotation speed of 100 rpm. The extruded material in the form of "spaghetti" was cooled in a water path, dried in air, granulated using a chopper, and subsequently subjected to grinding in a rotating-blade mill, to obtain a powder having an average particle diameter of 350 µm.

The mechanical properties of the crosslinkable composition obtained were measured. For this purpose, samples of said crosslinked composition, obtained by compression molding at 200° C. at a pressure of 500 kg/cm$^2$, for 20 minutes, having a thickness of 3.2 mm, a height of 150 mm and a width of 150 mm, underwent measurements for:
Elongation at Break, in accordance with ASTM D 638-10 standard;
Izod Impact Strength, in accordance with ASTM D 256-10 standard;
Environmental Stress Crack Resistance (ESCR), in accordance with ASTM D 1693 standard, in the presence of a 10% solution of surfactant (Igepal® CO-630) in water, at a temperature of 50° C.

The results obtained are shown in Table 1.

EXAMPLE 2 (COMPARATIVE)

Example 2 was carried out in the same way as Example 1, except that 0.65 g of triallyl cyanurate (TAC) (Luvomaxx® TAC DL 50 from Lehvoss) and 0.9 g of 2,5-dimethyl-2,5-di(t-butylperoxy)hexyne-3 (Trigonox® 145-45B-pd from Akzo Nobel) were used.

The mechanical properties were measured as in Example 1: the results obtained are shown in Table 1.

EXAMPLE 3 (INVENTION)

Example 3 was carried out in the same way as Example 1, except that the following components were used:
90 g of high density polyethylene (HDPE) (Eraclene® MR 80 U from versalis spa) having the following features:
density of 0.955 g/cm$^3$;
Melt Flow Index (MFI), measured at 190° C. with a load of 2.16 kg in accordance with ISO 1133-1:2011 standard, of 25 g/10;

10 g of linear low density polyethylene (LLDPE) (Flexirene® MS 20 U from versalis spa) having the following features:
density of 0.920 g/cm³;
Melt Flow Index (MFI), measured at 190° C. with a load of 2.16 kg in accordance with ISO 1133-1:2011 standard, of 25 g/10;
0.65 g of triallyl cyanurate (TAC) (Luvomaxx® TAC DL 50 from Lehvoss) and
0.9 g of 2,5-dimethyl-2,5-di(t-butylperoxy)hexyne-3 (Trigonox® 145-45B-pd from Akzo Nobel).

The mechanical properties were measured as in Example 1: the results obtained are shown in Table 1.

EXAMPLE 4 (COMPARATIVE)

Example 4 was carried out in the same was as Example 1, except that 100 g of high density polyethylene (HDPE) (Eraclene® MR 80 U from versalis spa) were used.

The mechanical properties were measured as in Example 1: the results obtained are shown in Table 1.

TABLE 1

| MECHANICAL PROPERTIES | EXAMPLE 1 (comparative) | EXAMPLE 2 (comparative) | EXAMPLE 3 (invention) | EXAMPLE 4 (comparative) |
|---|---|---|---|---|
| Elongation at break (%) | 280 | 370 | 453 | 120 |
| Izod Impact Strength (23° C.) (J/m) | 202.5 | 277.6 | s.n.b. | 40 |
| Izod Impact Strength (−20° C.) (J/m) | 75 | 85 | 95 | 35 |
| ESCR (hours) | >1000 | >1000 | >1000 | <20 | s.n.b.: sample not broken.

From the data shown in Table 1, it can be seen that the crosslinkable composition object of the present invention [Example 3 (invention)] has improved mechanical properties, in particular Elongation at Break and Izod Impact Strength, both by comparison with the use of crosslinkable compositions containing only linear high density polyethylene (HDPE) [Examples 1 and 2 (comparative)] and by comparison with the non-crosslinkable composition containing only linear high density polyethylene (HDPE) [Example 4 (comparative)].

The invention claimed is:

1. Crosslinkable composition comprising:
(a) from 80% by weight to 98% by weight, of at least one high density polyethylene (HDPE);
(b) from 2% by weight to 20% by weight, of at least one linear low density polyethylene (LLDPE);
(c) from 0.2 parts by weight to 1.5 parts by weight, with respect to 100 parts by weight of (a)+(b), of at least one crosslinking agent selected from organic peroxides;
(d) from 0.2 parts by weight to 2.5 parts by weight, with respect to 100 parts by weight of (a)+(b), of at least one co-crosslinking agent selected from allyl compounds,
wherein said high density polyethylene (HDPE) (a) and said linear low density polyethylene (LLDPE) (b) have the same Melt Flow index (MFI), measured at 190° C. with a load of 2.16 kg in accordance with ISO 1133-1:2011 standard.

2. Crosslinkable composition according to claim 1, wherein said high density polyethylene (HDPE) (a) is selected from said polyethylenes in which the density ranges from 0.950 g/cm³ to 0.960 g/cm³.

3. Crosslinkable composition according to claim 2, wherein said linear low density polyethylene (LLDPE) (b) is selected from polyethylenes having a density lower than 0.940 g/cm³.

4. Crosslinkable composition according to claim 2, wherein said linear low density polyethylene (LLDPE) (b) is selected from said polyethylenes in which the density ranges from 0.915 g/cm³ to 0.935 g/cm³, and wherein the Melt Flow Index (MFI) ranges from 15 g/10 minutes to 35 g/10 minutes.

5. Crosslinkable composition according to claim 1, wherein said linear low density polyethylene (LLDPE) (b) is selected from polyethylenes having a density lower than 0.940 g/cm³, and wherein the Melt Flow Index (MFI) ranges from 1 g/10 minutes to 100 g/10 minutes.

6. Crosslinkable composition according to claim 1, wherein said organic peroxides (c) are selected from organic peroxides having general formula (I):

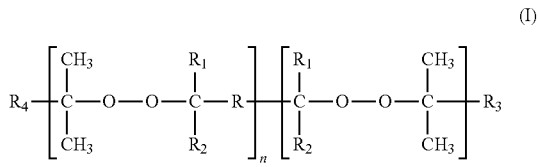

in which:
R is a divalent hydrocarbon group, selected from:

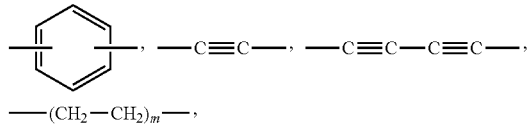

in which m represents a number between 1 and 8;
$R_1$ and $R_2$, equal or different, represent a linear or branched $C_1$-$C_{12}$-alkyl group;
$R_3$ and $R_4$, equal or different, represent a linear or branched $C_1$-$C_{12}$ alkyl group;
n is 0 or 1.

7. Crosslinkable composition according to claim 6, wherein said organic peroxides having general formula (I) are selected from: a group of bis(alkylperoxy)alkanes selected from 2,5-bis(t-amylperoxy)-2,5-dimethylhexane, 2,5 bis(t-butylperoxy)-2,5-dimethylhexane, 3,6-bis(t-butylperoxy)-3,6-dimethyloctane, 2,7-bis(t-butylperoxy)-2,7-dimethyloctane, 8,11-bis(t-butylperoxy)-8,11-dimethyloctadecane, or mixtures thereof; a group of bis(alkylperoxy)benzenes selected from α,α'-bis(t-amylperoxy-iso-propyl) benzene, α,α'-bis(t-butylperoxy-isopropyl)benzene, or mixtures thereof; a group of bis(alkylperoxy)acetylenes selected from 2,7-dimethyl-2,7-di(t-butylperoxy)-octadiyne-3,5,2,7-dimethyl-2,7-di(peroxyethylcarbonate)-octadiyne-3,5,3,6-dimethyl-3,6-di(peroxyethylcarbonate)octyne-4,3,6-dimethyl-3,6-di(t-butyl-peroxy)octyne-4,2,5-dimethyl-2,5-di(peroxy-n-propyl-carbonate)hexyne-3,2,5-dimethyl-2,5-di(peroxy-iso-butylcarbonate)hexyne-3,2,5- dimethyl-2,5-di(peroxyethyl-carbonate)hexyne-3,2,5-dimethyl-2,5-di(α-cumylperoxy)hexyne-3,2,5-dimethyl-2,5-di(t-butylperoxy)hexyne-3, or mixtures thereof; or mixtures thereof.

8. Crosslinkable composition according to claim 1, wherein said allyl compounds (d) are selected from: allyl methacrylate, diallyl itaconate, diallyl phthalate, triallyl trimellitate, triallyl trimethallyl trimellitate, triallyl cyanurate (TAC), triallyl iso-cyanurate (TAIL), triallyl phosphate, or mixtures thereof.

9. Crosslinkable composition according to claim 1, wherein said crosslinkable composition comprises (e) at least one peroxide scavenger selected from: a group of sulfur-containing compounds selected from esters of thiodipropionic acid, or mixtures thereof; organic phosphites, organic phosphonates, organic phosphonites, organic phosphates, or mixtures thereof.

10. Crosslinkable composition according to claim 9, wherein said peroxide scavenger (e) is present in said crosslinkable composition in an amount ranging from 0.01 parts by weight to 0.1 parts by weight, with respect to 100 parts by weight of (a)+(b).

11. Crosslinkable composition according to claim 1, wherein said crosslinkable composition comprises (f) at least one antioxidant selected from sterically hindered phenols.

12. Crosslinkable composition according to claim 11, wherein said antioxidant (f) is present in said crosslinkable composition in an amount ranging from 0.01 parts by weight to 0.1 parts by weight, with respect to 100 parts by weight of (a)+(b).

13. Crosslinkable composition according to claim 1 comprising:
  (a) from 85% by weight to 95% by weight of said at least one high density polyethylene (HDPE);
  (b) from 5% by weight to 15% by weight of said at least one linear low density polyethylene (LLDPE);
  (c) from 0.5 parts by weight to 0.8 parts by weight with respect to 100 parts by weight of (a)+(b), of said at least one crosslinking agent selected from organic peroxides;
  (d) from 0.5 parts by weight to 1.0 parts by weight with respect to 100 parts by weight of (a)+(b), of said at least one co-crosslinking agent selected from allyl compounds.

14. End-products obtained by rotational molding ("rotomolding") of the crosslinkable composition according to claim 1.

15. Crosslinkable composition comprising
  (a) from 80% by weight to 98% by weight, of at least one high density polyethylene (HDPE);
  (b) from 2% by weight to 20% by weight, of at least one linear low density polyethylene (LLDPE);
  (c) from 0.2 parts by weight to 1.5 parts by weight, with respect to 100 parts by weight of (a)+(b), of at least one crosslinking agent selected from organic peroxides;
  (d) from 0.2 parts by weight to 2.5 parts by weight, with respect to 100 parts by weight of (a)+(b), of at least one co-crosslinking agent selected from allyl compounds,
wherein said high density polyethylene (HDPE) (a) is selected from polyethylenes having a density higher than 0.940 g/cm$^3$, and a Melt Flow Index (MFI), measured at 190° C. with a load of 2.16 kg in accordance with ISO 1133-1:2011 standard, ranging from 10 g/10 minutes to 100 g/10 minutes.

16. Crosslinkable composition comprising
  (a) from 80% by weight to 98% by weight, of at least one high density polyethylene (HDPE);
  (b) from 2% by weight to 20% by weight, of at least one linear low density polyethylene (LLDPE);
  (c) from 0.2 parts by weight to 1.5 parts by weight, with respect to 100 parts by weight of (a)+(b), of at least one crosslinking agent selected from organic peroxides;
  (d) from 0.2 parts by weight to 2.5 parts by weight, with respect to 100 parts by weight of (a)+(b), of at least one co-crosslinking agent selected from allyl compounds,
wherein said linear low density polyethylene (LLDPE) (b) has a Melt Flow Index (MFI) measured at 190° C. with a load of 2.16 kg in accordance with ISO 1133-1:2011 standard, that is higher than the Melt Flow Index of said high density polyethylene (HDPE) (a).

17. Crosslinkable composition comprising:
  (a) from 80% by weight to 98% by weight, of at least one high density polyethylene (HDPE);
  (b) from 2% by weight to 20% by weight, of at least one linear low density polyethylene (LLDPE);
  (c) from 0.2 parts by weight to 1.5 parts by weight, with respect to 100 parts by weight of (a)+(b), of at least one crosslinking agent selected from organic peroxides;
  (d) from 0.2 parts by weight to 2.5 parts by weight, with respect to 100 parts by weight of (a)+(b), of at least one co-crosslinking agent selected from allyl compounds,
wherein said high density polyethylene (HDPE) (a) and said linear low density polyethylene (LLDPE) (b) both have a Melt Flow index (MFI), measured at 190° C. with a load of 2.16 kg in accordance with ISO 1133-1:2011 standard, ranging from 15 g/10 minutes to 35 g/10 minutes.

* * * * *